C. HOWELL.
Harvester.
No. 18,340.  Patented Oct. 6, 1857.
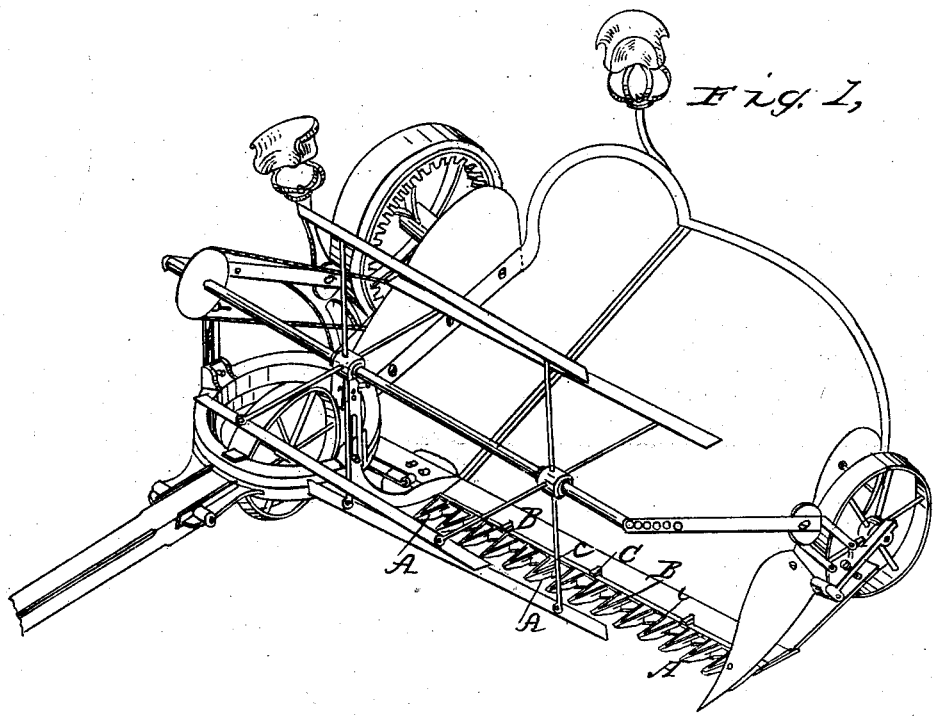
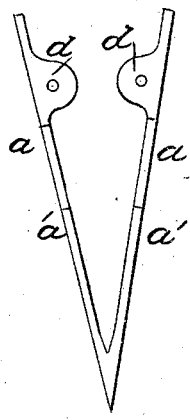
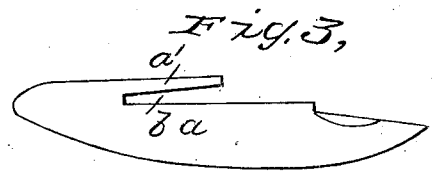
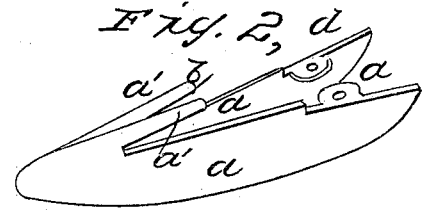
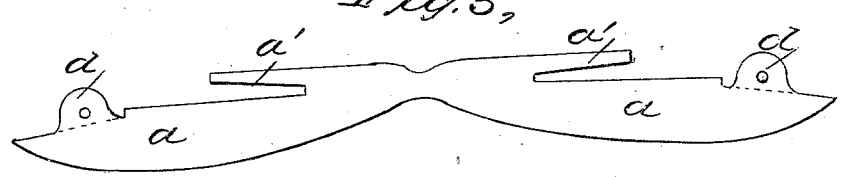

UNITED STATES PATENT OFFICE.

CHARLES HOWELL, OF CLEVELAND, OHIO.

IMPROVED GUARD-FINGER FOR REAPING AND MOWING MACHINES.

Specification forming part of Letters Patent No. 18,340, dated October 6, 1857.

*To all whom it may concern:*

Be it known that I, CHARLES HOWELL, of Cleveland, in the county of Cuyahoga and State of Ohio, have invented a certain new and useful Improvement in Reaping and Mowing Machines, of which the following is a full, clear, and exact description, reference being had to the accompanying drawings, making part of this specification, in which—

Figure 1 represents a view in perspective of a machine for reaping and mowing with my improvement applied thereto; Fig. 2, a view in perspective of a guard-finger detached; Fig. 3, a side elevation, and Fig. 4 a plan, of the same. Fig. 5 represents a modified form of the tooth as struck from a sheet of metal ready to be bent into form, and the ears turned down, as in Fig. 4.

My invention relates to the guards or fingers of a reaping and mowing machine, which I believe, as a general rule, have heretofore been made entirely too heavy and clumsy for the nature of the work they have to perform, and hence are exceedingly liable to become clogged or gummed up, thus preventing the free working of the knife.

The object of my invention is to obviate these difficulties; and it consists in constructing them of sheet metal in a peculiar manner, to be hereinafter fully described.

To enable others skilled in the art to make, construct, and use my invention, I will now proceed to describe it in detail.

In the accompanying drawings, the guard-finger A is represented as being constructed of two flat pieces or plates, *a*, of steel or other suitable metal, welded together at the point in such manner as to form an acute angle or V-shaped finger. On the upper side of these plates are cut slots *b*, into which the knife plays, the upper side forming a lip, *a'*, for the purpose of keeping the knife down to its work. These lips *a'* are made of a length sufficient to project over the whole width of the sections or blades *c* of the knife, flush with the outer edge of the cutter-bar B. The upper sides of the rear ends of the plates *a* are depressed and made to fit exactly the conformation of the under side of the finger-bar C when mounted on it, while their front end is placed in the same plane as its upper surface. The fingers A, thus formed, are secured to the finger-bar C by means of screws passing through ears *d*, formed on their rear end, into the finger-bar, or in any other suitable manner. On the upper surface of the finger-bar C is arranged the cutter-bar B, the knives or blades *c* of which play in the horizontal cut *b*, formed by the lips *a'* and the cutting-edge of the fingers, made for that purpose, as seen in Fig. 1. The under side of the plates *a*, at their rear end, are gradually curved off or inclined toward the under side of the finger-bar, so as to present as little obstruction as possible to the passage of the fingers over the ground or stubble as the machine advances.

When the machine is put in operation, any grass or other fibrous substances which may be brought in the fingers will instantly drop on the ground through the vertical recess formed between the plates of the fingers, thus removing any liability of the knife to clog, this result being further assisted by the action of the stubble, inasmuch as a portion of it, (that which lies immediately beneath the fingers,) as the grain is cut, erects itself between the plates of the fingers and drags out such grass or other material as may have worked in by the action of the cutters through the opening in the rear end of the fingers between their ears *d*.

From the foregoing it will be apparent that instead of welding the plates together at the point the two pieces may be cut in a single piece from a sheet of metal and bent into proper form, should it be deemed advisable so to do.

Having thus described my invention, what I claim as new, and desire to secure by Letters Patent, is—

Constructing the guard-fingers of reaping and mowing machines of sheet metal, in the manner substantially as described and shown in Figs. 2, 3, 4, and 5.

In testimony whereof I hereunto set my hand.

CHAS. HOWELL.

Witnesses:
P. HANNAY,
W. LESKY.